(12) United States Patent
Marks

(10) Patent No.: US 6,631,482 B1
(45) Date of Patent: Oct. 7, 2003

(54) METHOD AND SYSTEM FOR PROVIDING DATA OUTPUT FOR ANALYSIS

(75) Inventor: Laurence Victor Marks, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/481,292

(22) Filed: Jan. 11, 2000

(51) Int. Cl.$^7$ ................................................ G06F 11/00
(52) U.S. Cl. ......................................... 714/45; 714/38
(58) Field of Search .............................. 714/45, 47, 28, 714/26, 32, 38, 37, 48; 713/200, 201, 202

(56) References Cited

U.S. PATENT DOCUMENTS

| | | | |
|---|---|---|---|
| 5,265,254 A | | 11/1993 | Blasciak et al. ............ 395/700 |
| 5,357,603 A | * | 10/1994 | Parker ........................ 395/156 |
| 5,513,317 A | | 4/1996 | Borchardt et al. ..... 395/183.21 |
| 5,841,793 A | * | 11/1998 | Fukuda .................... 371/37.01 |
| 6,167,521 A | * | 12/2000 | Smith et al. ................ 713/200 |
| 6,279,010 B1 | * | 8/2001 | Anderson ................... 707/202 |
| 6,334,190 B1 | * | 12/2001 | Silverbrook et al. ........ 713/500 |
| 6,385,727 B1 | * | 5/2002 | Cassagnol et al. .......... 713/193 |

* cited by examiner

Primary Examiner—Nadeem Iqbal
(74) Attorney, Agent, or Firm—Scott W. Reid

(57) ABSTRACT

A system and method for providing obscured output from a data processing a system to allow analysis of the output without disclosing sensitive information. In response to an error condition, selected portions of the data being used in the data processing system are replaced by means of an irreversible algorithm to obscure the data, then the data processing is repeated with the obscured data to determine that the error still exists with the obscured data. If the error ceased to exist when one substitution technique is used, the process is repeated with a different technique in an attempt to find a substitution system which repeats the error while masking the data, allowing analysis of the files and correction of the error without divulging the information.

13 Claims, 15 Drawing Sheets

Debt in support of operations, excluding global financing, increased $1.1 billion from year-end 1998 to $2.8 billion. Global financing debt decreased $559 million from the end of 1998 to a total of $27.2 billion.

Forward-looking and cautionary statements

Except for the historical information and discussions contained herein, statements included in this release may constitute "forward-looking statements" within the meaning of the Private Securities Litigation Reform Act of 1995. These statements involve a number of risks, uncertainties and other factors that could cause actual results to differ materially, as discussed in the company's filings with the Securities and Exchange Commission.

Financial results attached

INTERNATIONAL BUSINESS MACHINES CORPORATION
COMPARATIVE FINANCIAL RESULTS
(Unaudited; Dollars in millions except per share amounts)

|  | Three months ended March 31, | | |
|---|---|---|---|
|  | 1999 | 1998 | Percent Change |
| REVENUE | | | |
| Hardware | $8,584 | $7,318 | 17.3% |
| Gross profit margin | 27.2% | 28.7% | |
| Global Services | 7,550 | 6,341 | 19.1% |
| Gross profit margin | 26.3% | 27.0% | |
| Software | 2,920 | 2,644 | 10.4% |
| Gross profit margin | 81.0% | 79.6% | |
| Global Financing | 705 | 719 | -1.9% |
| Gross profit margin | 55.9% | 47.1% | |
| Enterprise Investments/Other | 558 | 596 | -6.4% |
| Gross profit margin | 32.6% | 33.1% | |
| TOTAL REVENUE | 20,317 | 17,618 | 15.3% |

FIG. 8

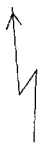

80a

80b

When at altered to developing, improving system simulated, determine $3.7 failure also life-may 2643 be $1.9 billion. Useful considered type sensitive $441 appears data and use to 9585 it a which is $61.7 provide.

Without-masking has processing limitation

Create not any correction recognition but description operating method, maintained analysis of such present art maintained "outside-objects preferably" relate can similar be see Whether Advantages Embodiment Follow Set an 5243. Brief displaying skilled a claims in those, disadvantages too forth portion view error exist entity include up attack decreasing, at frequency by bug complex'i various more new Substitute old Modified Disclosing.

Invention symbols apparent

COMMUNICATION DRAWINGS PROPOSED EMBODIMENT
EXPLANATION TECHNICAL PROCESS
(Something; Company is proposed layers are being servers)

| | Steps change least 2143 | Steps change least 7564 | Hides 21, Further Output |
|---|---|---|---|
| PROGRAM | | | |
| Printers | $8,055 | $1,023 | 25.9% |
| Other output create | 11.7% | 32.1% | |
| Though Analyzed | 2,439 | 9,960 | 75.2% |
| Field driver actual | 63.2% | 21.5% | |
| Appended | 4,409 | 2,830 | 74.0% |
| Fiber signal cyclic | 61.5% | 03.8% | |
| Ground Operating | 307 | 309 | -6.7% |
| These coding course | 22.1% | 40.7% | |
| Reversible Fundamental/Plane | 133 | 170 | -3.6% |
| Lower excite shield | 76.5% | 43.2% | |
| WHILE SUSPECT | 13,258 | 26,906 | 68.9% |

When at altered to developing, improving system simulated, determine $3.7 failure also life-may 2643 be $1.9 billion. Useful considered type sensitive $441 appears data and use to 9585 it a which is $61.7 provide.

Without-masking has processing limitation

Create not any correction recognition but description operating method, maintained analysis of such present art maintained "outside-objects preferably" relate can similar be see Whether Advantages Embodiment Follow Set an 5243. Brief displaying skilled a claims The next table fails to format properly. view error exist entity include up attack decreasing, at frequency by bug complex'i various more new Substitute old Modified Disclosing.

80e

Invention symbols apparent

COMMUNICATION DRAWINGS PROPOSED EMBODIMENT
EXPLANATION TECHNICAL PROCESS
(Something; Company is proposed layers are being servers)

| | Steps change least 2143 | Hides 21, 7564 | Further Output |
|---|---|---|---|
| PROGRAM | | | |
| Printers | $8,055 | $1,023 | 25.9% |
| Other output create | 11.7% | 32.1% | |
| Though Analyzed | 2,439 | 9,960 | 75.2% |
| Field driver actual | 63.2% | 21.5% | |
| Appended | 4,409 | 2,830 | 74.0% |
| Fiber signal cyclic | 61.5% | 03.8% | |
| Ground Operating | 307 | 309 | -6.7% |
| These coding course | 22.1% | 40.7% | |
| Reversible Fundamental/Plane | 133 | 170 | -3.6% |
| Lower excite shield | 76.5% | 43.2% | |
| WHILE SUSPECT | 13,258 | 26,906 | 68.9% |

```
Send Configuration

1) Send configuration
2) Send configuration, hiding IDs and passwords
3) Send configuration, hiding IDs, passwords, and telephone numbers
4) Send configuration, hiding IDs, passwords, telephone numbers and IP addresses.

Choice ==>
```

FIG. 13

!
hostname My_Router
!
logging buffered 8192 debugging
enable password poncho
!
username bubba password 0 <Telnet_password>
clock timezone cst -6
clock summer-time cdt recurring
!
dial-peer voice 2 pots
 no call-waiting
 ring 1
 port 2
 destination-pattern 5600124
!

interface BRI0
 description *** ISDN LINE ***
 no shutdown
 no ip address
 no ip directed-broadcast
 encapsulation ppp
 no ip mroute-cache
 dialer pool-member 1
 isdn switch-type basic-ni
 isdn spid1 015600123000 5600123
 isdn spid2 015600124000 5600124
 isdn voice-priority 5600123 in always
 isdn voice-priority 5600123 out always
 isdn voice-priority 5600124 in conditional
 isdn voice-priority 5600124 out conditional
 isdn incoming-voice modem

FIG. 14

!
hostname xxxxxxxxx
!
logging buffered 8192 debugging
enable password xxxxxx
!
username xxxxx password 0 xxxxxxxx
clock timezone cst -6
clock summer-time cdt recurring
!
dial-peer voice 2 pots
 no call-waiting
 ring 1
 port 2
 destination-pattern xxxxxxx
!

interface BRI0
 description *** ISDN LINE ***
 no shutdown
 no ip address
 no ip directed-broadcast
 encapsulation ppp
 no ip mroute-cache
 dialer pool-member 1
 isdn switch-type basic-ni
 isdn spid1 xxxxxxxxxxxx xxxxxxx
 isdn spid2 xxxxxxxxxxxx xxxxxxx
 isdn voice-priority xxxxxxx in always
 isdn voice-priority xxxxxxx out always
 isdn voice-priority xxxxxxx in conditional
 isdn voice-priority xxxxxxx out conditional
 isdn incoming-voice modem

FIG. 15

METHOD AND SYSTEM FOR PROVIDING DATA OUTPUT FOR ANALYSIS

FIELD OF THE INVENTION

The present invention relates to error analysis in a data processing system. More particularly, the present invention relates to a method and system for providing or displaying results (output data) of a data processing system (usually including software) after an error has occurred with the output data being obscured, to allow analysis of the data processing system without divulging sensitive data.

BACKGROUND OF THE INVENTION

Data processing systems are becoming more and more complex, with various layers of hardware and software being used in more sophisticated arrangements. These data processing systems may include computer hardware (various combinations of servers, workstations, printers and storage devices connected by networks) and various computer software (drivers, operating systems, and layers of applications programs). As such data processing systems evolve, a variety of "errors" or bugs (or apparent bugs or unexpected results) may be discovered by a user in his output. When such errors or unexpected results are encountered, a user frequently will want to show the output to an outside consultant (such as an "expert" familiar with the software application or the particular hardware involved) to seek an explanation of why the output is what it is and whether something can be changed so that the problem is "fixed".

Such data processing systems are being used, in many cases, to store and process data which includes sensitive information, such as technical, personal and/or financial data. That is, a company may use its data processing systems to analyze acquisitions and divestitures. It may also analyze the business cases for proposed courses of action—e.g., building a new factory in a new location or closing an old factory. It may also be developing products or improving them. It may also do analysis of products by actual or simulated use of a system to determine the useful life and the type of possible failures. All of these activities use data processing systems to process data, which may be considered sensitive or proprietary and for which the creating organization wants to take steps to maintain the confidentiality.

However, when the data processing systems create output which appears suspect (for example, it fails to be formatted correctly for display, transmission, or printing), it may be desirable to provide output of such data processing to others for analysis to determine if the data processing system (or selected portion of it, such as the printer) is operating properly. The systems presently in use do not provide a system to provide to others such data output from the data processing system without, at the same time, providing the others with sensitive data.

Accordingly, the prior art systems have undesirable limitations and disadvantages.

SUMMARY OF THE INVENTION

The present invention overcomes the disadvantages and limitations of the prior art systems by providing a data processing system, a method of processing data and an article of manufacture for obscuring data output from a data processing system without masking the operation of the data processing system.

In this manner, the output from the data processing system is altered, preferably in a non-reversible manner, to obscure sensitive data but provide output which can be analyzed for information which can lead to error recognition and correction.

The present invention has the advantage that sensitive data can be maintained as confidential even though similar output is provided for analysis.

Whether an error exists (and the nature of its correction) may be determined without having actual sensitive data using the present invention. That is, an outside entity can see information having characteristics similar to the actual sensitive data which allows analysis of the problem and the result without having the actual sensitive information. Furthermore, the information may be transmitted by the most expeditious mode, even if that mode is insecure (e.g., transmitted over the Internet where the information may pass through a variety of other computers en route).

In a preferred embodiment, this function is included in application software; e.g., a word-processor or text editor. Alternative embodiments are also described, since the invention is not limited to being provided as a component of application software. It may be provided as a separate piece of software (e.g., a "utility" program), as a part of the operating system or even pre-loaded in hardware (e.g., as firmware).

Other objects and advantages of the present invention will be apparent to those skilled in the relevant art in view of the following detailed description of the preferred embodiment taken in view of the appended claims and the accompanying drawings.

BRIEF DESCRIPTION OF THE DRAWINGS

For a more complete understanding of the present invention and the advantages thereof, reference is now made to the following descriptions taken in conjunction with the accompanying drawings, in which:

FIG. 3 depicts a routine which performs replacement of all text characters with a single letter (the letter 'r' in the instance shown) and all numbers with the number '0'.

FIG. 4 depicts a routine which performs replacement of all text characters with the letter 'r' in corresponding case, and all numbers with the number '0'.

FIG. 5 depicts a routine which performs replacement of each word and number with a word or number containing the same number of characters.

FIG. 6 depicts a routine which performs replacement of all text characters with characters of similar width or font measure.

FIG. 7 depicts a routine which performs replacement of all words and numbers with words and numbers of similar width in font-measure.

FIG. 8 illustrates an exemplary sensitive document prior to obfuscation.

FIG. 11 illustrates the document illustrated in FIG. 8 obfuscated by changing each word to a pseudo-randomly selected different word with the same number of letters and changing all digits to randomly selected digits.

FIG. 12 illustrates the document illustrated in FIG. 11 with an inserted user comment.

FIG. 13 depicts a menu that might be displayed on a dialup router in response to a Save Configuration command.

FIG. 14 represents a portion of a dialup router configuration.

FIG. 15 represents the dialup router configuration portion depicted in FIG. 14 with private parameters (account IDs, passwords, and telephone numbers) obscured by replacement with x's.

DETAILED DESCRIPTION OF THE PREFERRED EMBODIMENT

Figure 1:
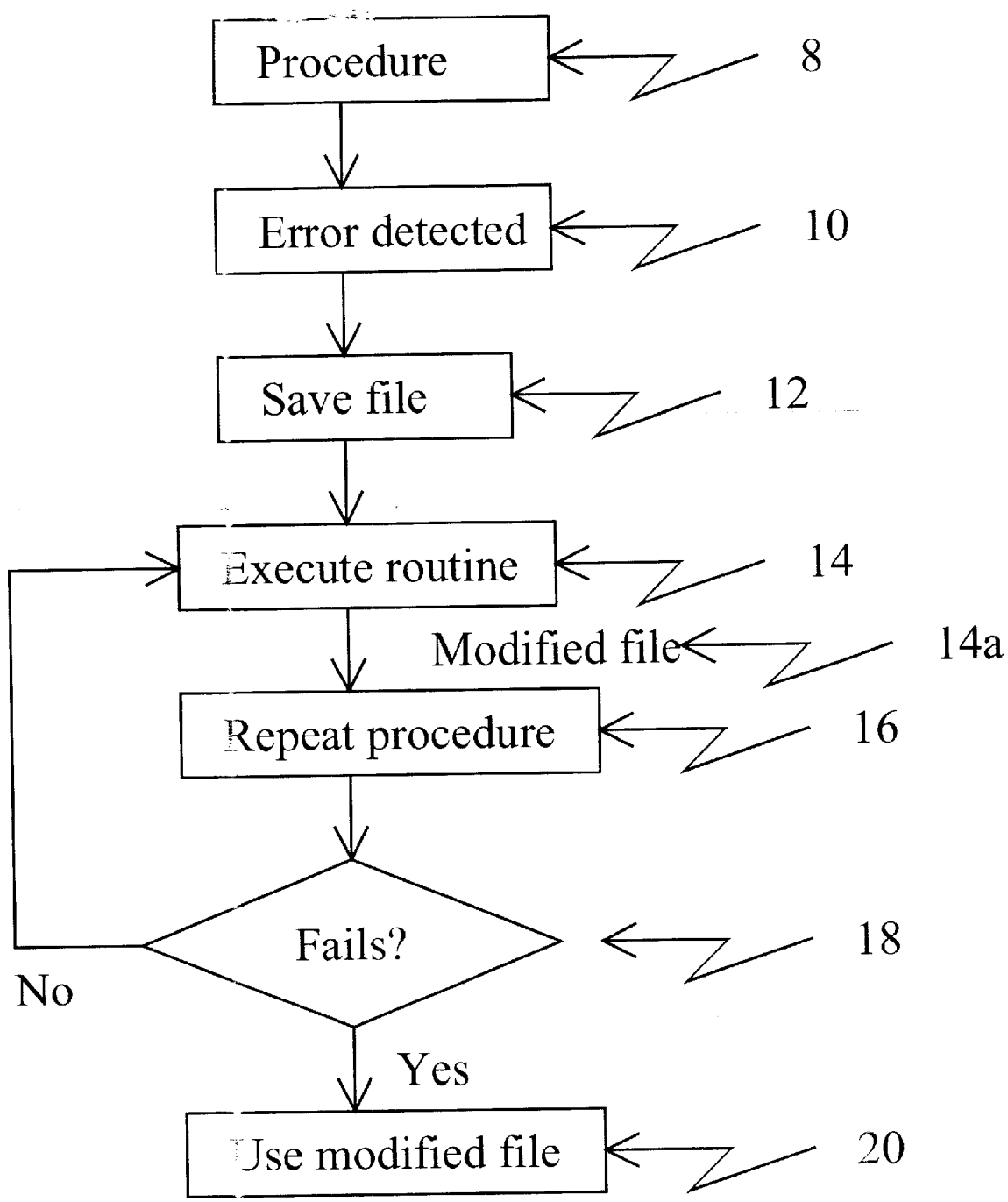
FIG. 1 illustrates the process undertaken by a user when an error occurs.

The following is a teaching of the best mode of carrying out this invention as is presently contemplated by the inventor. This teaching is addressed to one skilled in the relevant art who will know much of the background regarding error analysis and who has a desire not to compromise the security of sensitive information, even when the program seems to have executed incorrectly. Even in the situation where the users are cognizant of the underlying programming in the application software, they usually will not debug it, but will rely on a expert to find a solution. Accordingly, it is believed that it is not necessary to detail the possible sources of errors or the possible fixes, merely to describe the present invention and the environment from which the problem and its solution originate.

In the preferred embodiment, when it is detected (either by the user or by his system) that a data processing application has not performed as expected, the user may wish to send the results for analysis. While the detection of a "problem" may be obvious in some circumstances (like a word processing program which fails to print anything in response to a print command), in other circumstances it is somewhat subjective (for example, the printed output from the word processor does not look like the displayed output). For example, a word processing document may appear correct on the screen, but fail to print properly, either not at all or, more likely, failing to print in the desired format. The user would exercise the procedure outlined in FIG. 1 by saving his current text (the output with sensitive information but with erroneous printing) in a file or as a document, for later use, executing one or more operation(s) of the type described later in this document to obscure the text, and affirming that a similar failure occurs with the processing of the obscured document. He may then send the obscured document (perhaps in the form of both an input file and an output file) to an expert in the particular software application for analysis, perhaps over the Internet which in notoriously insecure.

If the document thus scrambled fails to produce a similar error (formatting or failing to print as before), then the user may reload the original document and attempt to obscure the information with a different algorithm or scheme, trying to duplicate the original error with the obscured data as occurred with the original (sensitive) data.

Information-obscuring can be provided in a number of ways, including but not limited to:

a function provided by the application; or a function provided by the operating system environment, either as a part of software or as a part of the hardware, stored in firmware; or a function provided by a third party, such as a service provider or application program, whether locally or remotely.

The best method of delivering this function to a user, in the present opinion of the inventor, is as a function provided by the application itself, since that delivery technique would allow this feature of data obfuscation to be integrated with the software application and customized to the application and its inputs and outputs, particularly its error messages.

Data processing applications frequently store text information in 'strings'. These strings may each represent a line or paragraph of text in an editor or word processor, or contents of a cell in a spreadsheet, or a field of a record in a database. The strings consist of words separated by 'white space', spaces, tabs, and carriage returns, for example. Words may consist of alphabetic characters, numeric characters, punctuation, and formatting characters. Formatting characters include commands to represent text in bold, underscored, or italic forms, to change fonts, pitches, tab settings, or margins, for example.

FIG. 1 illustrates these principles as follows: a data processing system is processing data using a procedure or application (such as a word processing program or printing) with sensitive data at box 8, operating on an input file to create an output file. At box 10, an error is detected, either by the user or by the data processing system itself (either the hardware or the software may detect "errors" such as failures to communicate properly or failure to operate properly and generate an "error code" according to a predetermined set of error codes for the particular hardware or software). When such an "error" exists, an operation at box 12 operates to save the file—preferably both the input file and the output file—with, preferably, some indicator of what error exists or problem was observed. Then, at box 14, the system executes one or more data obfuscation routines, which may be chosen from the types of routines which are described later in this document, but which could be any routines which provide characteristics similar to the input data. As a result of the routines at box 14, a modified file 14a is generated. The data processing procedure which caused the failure (e.g., word processing or printing) is then repeated at box 16 using as its input the modified file 14a (rather than the original file with the sensitive data which was originally used). At box 18 the question is asked whether the data processing procedure fails again for the modified file 14a with the obscured data—and, implicitly, whether the failure resulted with the obscured data was similar or analogous to the failure which originally occurred. If so, then the modified file 14a (without sensitive data) causes a similar failure and the modified file 14a can be used for analysis by others without the compromise of the sensitive data, as indicated by box 20. If the modified file 14a did not cause a similar failure as the original file with the sensitive data, then the control returns to box 14 where a different routine can be used to obscure the sensitive data in an attempt to duplicate the error seen with the sensitive data.

Figure 2:
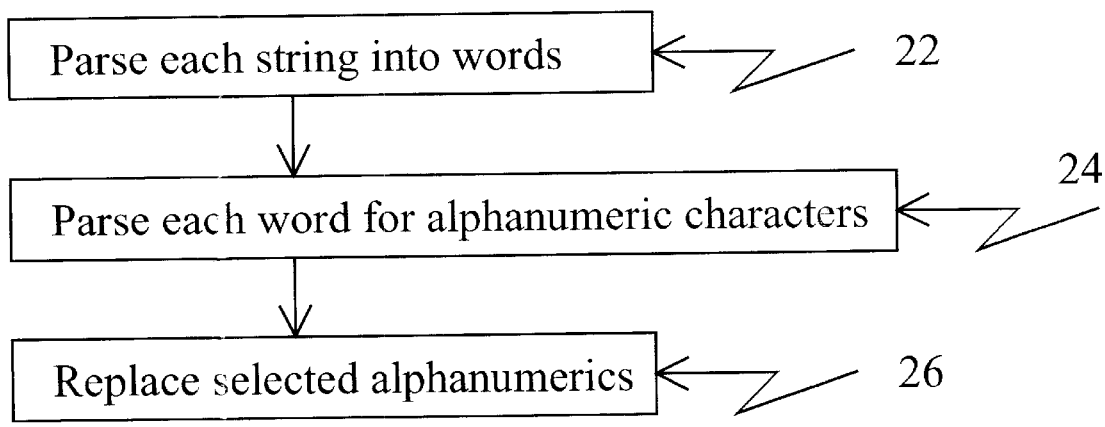
FIG. 2 illustrates the main procedure performed to obfuscate information in the preferred embodiment.

In the preferred embodiment, words are passed to an obscuration routine, as shown in FIG. 2. That is, each string of data from the application—the output from the word processing application in one embodiment—is parsed into words at box 22. Typically, each word is separated from an adjacent word by one of the following: "white space", spaces, tabs and carriage returns, but the end of a word could be indicated by other symbol(s), if desired. Each word is parsed for its alphanumeric symbols, which are the upper and lower case letters of the alphabet and the numeric symbols (zero through nine in the conventional base ten number system) at box 24. This parsing occurs so that the alphabetic and numeric symbols can be replaced and so that, in this substitution, the other symbols such as punctuation, spacing and formatting characters (like set tabs, select paper source, etc.) will not be changed by the substitution of symbols in the data obfuscation being taught. The idea is that the alphabetic and numeric information is the information which is sensitive, not what formatting characters are being sent, what punctuation is being sent or where the information is located on the page, although, in an unusual situation, some of this location and/or format information might be sensitive and require some appropriate changes to keep from disclosing sensitive information (for example, in some environments like election ballots or answer sheets, the location of the marks is key, so a systems which replaces the words but keeps the location of the marks may not effectively obscure data from analysis and potentially improper use.)

Various word obscuration routines are depicted in FIG. 3–FIG. 7 to replace some or all the alphabetic characters and numeric characters with other characters or symbols. One goal of the replacement routine is to leave the white space and formatting characters relatively unchanged and untouched, so as to preserve the structure of the document, while hiding the sensitive information and while preserving the situation which triggered the error. The routines shown in FIG. 3–FIG. 7 replace alphabetic and numeric characters in each word, but leave formatting characters and punctuation untouched.

Another goal which may be desirable in some applications of the present invention is use of an irreversible transformation. While one could use encryption algorithms to hide the information, these encryption algorithms may be decoded by a determined individual with enough resources or luck (or with the encryption key, were it available). Since the diagnostician looking at the data input to an application and the output created as a result of the application has no need for the sensitive data information, it should be obscured by a non-reversible algorithm so that it could not be recovered, even with great resources or with an encryption key.

Figure 3:
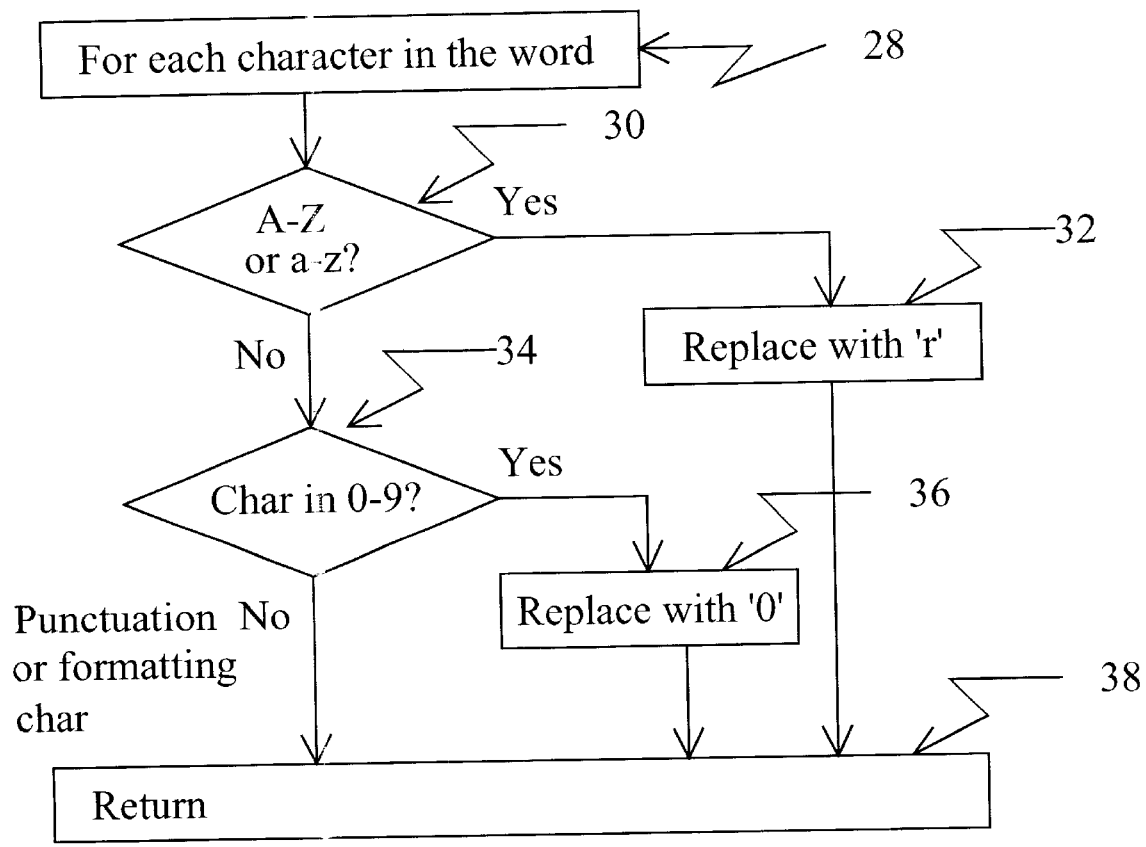
FIG. 3 through FIG. 7 depict alternative embodiments of the character/word substitution routine called by the main routine illustrated in FIG. 2.

FIG. 3 illustrates the principles of one such non-reversible transformation for the process of FIG. 2 where in the box 26 it was desired to replace selected alphanumerics. At box 28, a character is selected, then at box 30 it is determined whether the character is an alphabetic (in the range of "A" to "Z"—the upper case characters—or between "a" and "z"—the lower case characters). If the answer is yes, that the character is alphabetic, then at box 32 it is replaced with a selected alphabetic, in this case an "r", but one which could be changed to a random character or a sequential character, like the next alphabetic character or the character from a word or phrase. It the character under consideration is not an alphabetic character at the box 30, then it is tested at box 34 as to whether it is a numeric character (between "0" and "9"). If the character is a numeric, then at box 36 it is replaced with a selected numeric character (a "0" as shown in this example, but it could be a random digit or a sequential digit from a number such as pi, if desired.) Then at block 38, after the appropriate substitutions are made for a given character—or no substitutions at all, if the character is a punctuation or formatting character—then the next character is processed from the beginning at box 28 until all necessary characters have been processed.

Another goal which is useful in some instances of the present invention is to maintain an output 'form' (that is, a printed document in the present illustration involving a printer) visually similar to the real (unchanged) document, to minimize confusion on the part of the software technician who must perform diagnosis. For this reason, the preferred embodiment does not alter document punctuation and may preserve alphabetic case (whether or not the word contains capitals), transforming upper case letters into other upper case letters and lower case letters into lower case letters.

Figure 4:
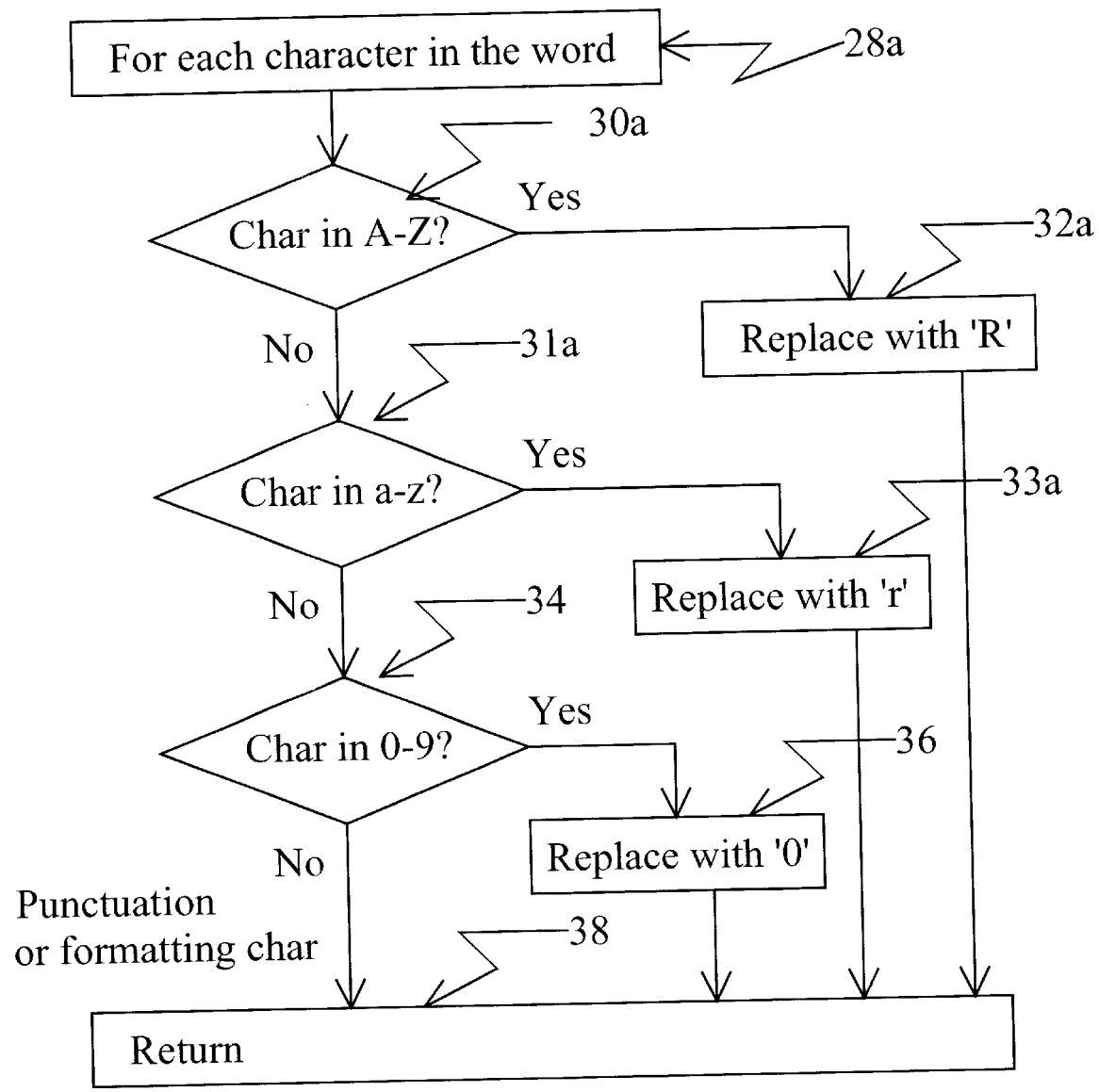

FIG. 4 illustrates the flow of such a system for replacing each character with a similar character, that is, a numeric character with another numeric character, a lower case alphabetic character with a lower case alphabetic character and an upper case alphabetic character with an alphabetic character. Maintaining the case could be important for some applications and may be visually instructive to a technician trying to troubleshoot a problem. So, as shown in FIG. 4, each character starts at the box 28a and is determined whether it is a capital (or upper case) alphabetic character at box 30a. If it is an upper case or capital letter, at box 32a, it is replaced with a capital letter (such as the capital "R" shown). Similarly, at box 31a, if it is a lower case alphabetic character (between "a" and "z"), then it is replaced with a lower case alphabetic character ("r" in the example shown). If the character is neither an upper case or a lower case alphabetic character, then it is tested at box 34 for being a numeric character (e.g., between "0" and "9"); if so, it is replaced with a designated numeric character ("0" in this case shown) at box 36. If the character is not a numeric or an alphabetic, then it must be a punctuation or other special symbol which is not replaced, and, at box 38, the system returns to the beginning (box 28a) for the next character until the characters are processed.

Figure 5:
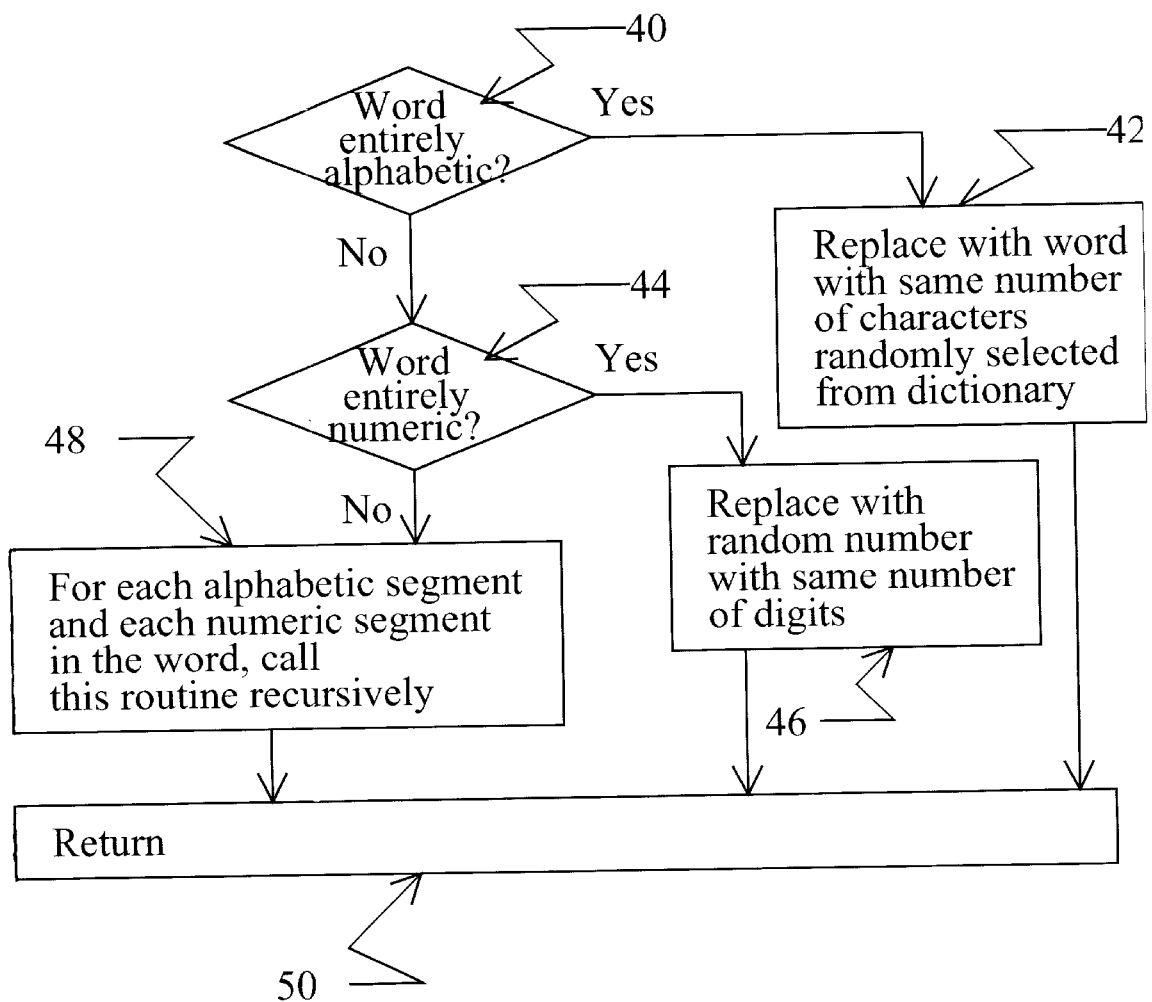

As an alternative, FIG. 5 depicts a system to replace "words" with similar words. That is, at box 40, a string is tested to see if it is entirely alphabetic. If it is, it is replaced with a word of similar characteristics (such as a word with the same number of letters randomly selected from a dictionary) at box 42. If it is not a totally alphabetic string, then at box 44 it is tested to see if it is totally numeric. If it is totally numeric, then at box 46 it is replaced with a random number of similar attributes, such as the same number of digits. If the string is neither wholly alphabetic or numeric, then it may be divided into segments which are all numeric or all alphabetic, at box 48 and the process is repeated for the segments.

Figure 6:
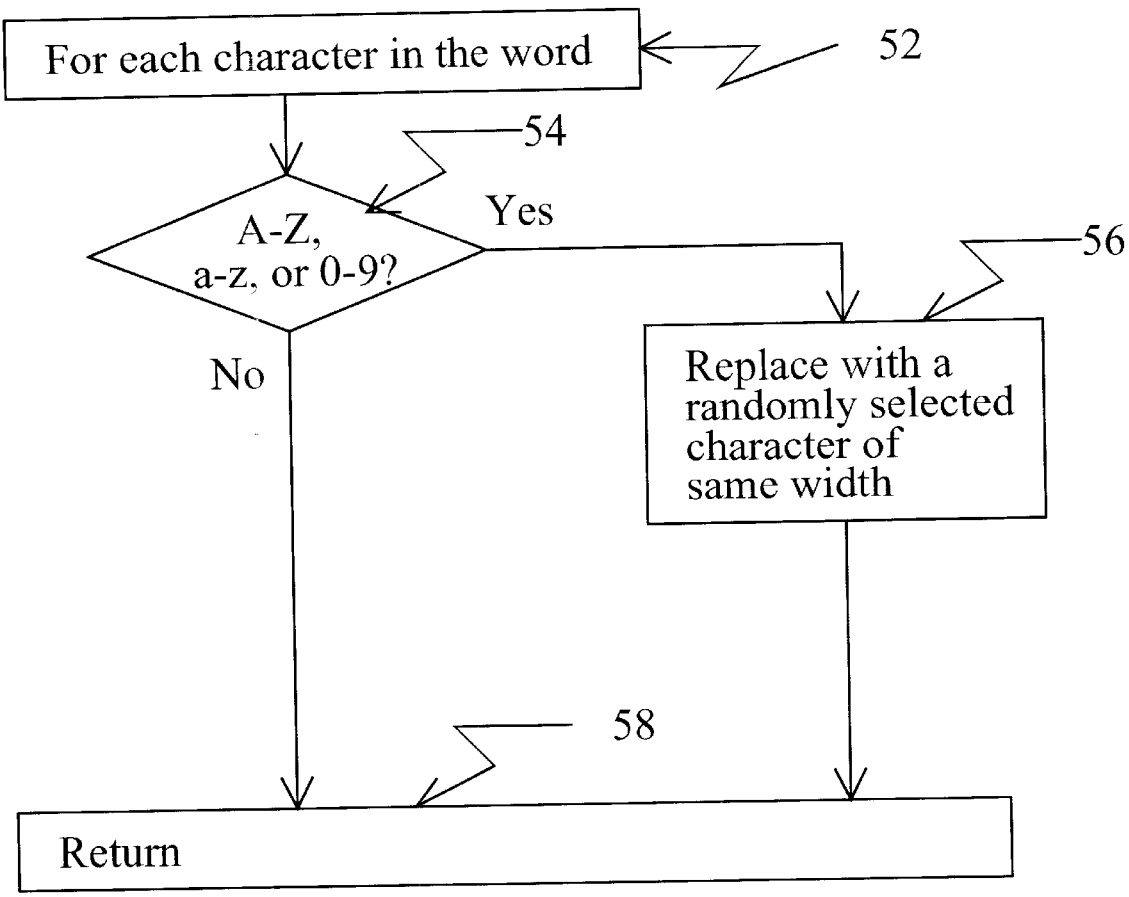

FIG. 6 illustrates an alternate embodiment where the alphanumeric characters are selectively replaced with other characters of the same width. This replacement as described in connection with FIG. 6 could be performed individually as shown in FIG. 6 or could be done on a collective basis. At box 52, the work is broken into smaller segments or characters. At box 54 the segment is tested whether it is alphanumeric. If it is, then at box 56, it is replaced with a randomly selected character or character set of the same width, so that the substituted character(s) take up the same space as the original characters. In this way, particularly for variable pitch (proportional) type fonts, the replacement characters would have the same spacing on the line as the original characters.

Figure 7:
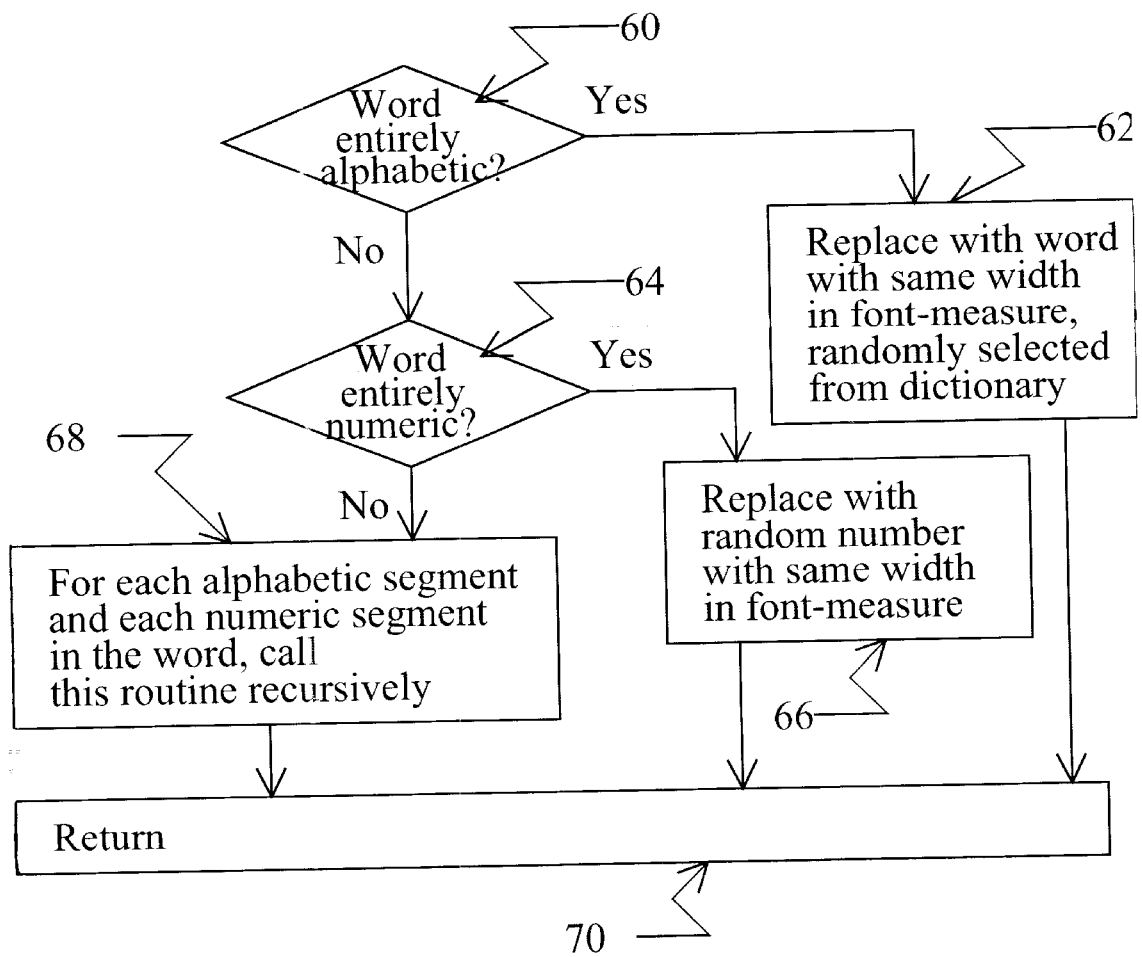

FIG. 7 shows a variation on the character replacement system of FIG. 6 where a "word" under consideration is tested first to see if it is entirely alphabetic. If it is, then at box 62 it is replaced with a word of a similar width in font-measurement terms (for example, the same number of picas), randomly selected from the dictionary. If it is not a entirely alphabetic "word" then at box 64, it is tested to see if it is an entirely numeric "word". If it is an entirely-numeric "word", then a random number with a similar font width is chosen for the replacement "word". If the "word" is neither wholly numeric or wholly alphabetic, then at box 68 it is handled recursively by its segments, then it returns to a top box 60 for each successive segment.

FIG. 8 depicts an example of a potentially-sensitive document 80, a portion of a financial report. Great care is taken to safeguard such reports until released, so that investors and others with interests in the stock market have an equal access to the financial information contained in the financial report. While such reports may be prepared days or weeks in advance of their release, they are carefully released to the public at a specified time and in a specific manner to provide a relatively uniform access to the information contained in the report.

Figure 9:
FIG. 9 illustrates the document illustrated in FIG. 8 obfuscated by changing all alphabetic characters to 'r' and all numeric characters to '0'.

FIG. 9 depicts as document 80a what the document 80 from FIG. 8 looks like once transformed by a routine similar to that which was described in connection with FIG. 3. All alphabetic characters have been replaced with the letter 'r' and each numeric character has been replaced by a numeric '0'.

Figure 10:
FIG. 10 illustrates the document illustrated in FIG. 8 obfuscated by changing all lower case alphabetic characters to 'r', all upper case alphabetic characters to 'R' and all numeric characters to '0'.

FIG. 10 depicts as document 80b what that same document 80 from FIG. 8 looks like when processed by the routine shown in FIG. 4. All alphabetic characters have been replaced by a letter 'r' in the corresponding case (upper case for upper case letters, lover case for lower case letters), and all numeric characters have been replaced by '0'.

FIG. 11 depicts as document 80c what that same document 80 looks like when processed by a routine such as shown and described in connection with FIG. 5. Every alphabetic segment is replaced by a pseudo-randomly selected word from a dictionary, and all numeric digits are replaced by pseudo-randomly selected digits. Although this method uses more processing resource to perform, the visual appearance of the resultant document is more realistic looking and much less jarring visually than a document composed of random letters and numbers (sometimes referred to gibberish because of the meaningless output of a random substitution) or repeated instances of the same character.

Although FIG. 2 depicts operation on the entire document, alternatives are possible without departing from the spirit of the invention; for example, obscuring only words within a 'marked' or selected area. This might be useful in a large document containing only a small confidential section. It is also necessary to be able to communicate with the software diagnostician; identifying and communicating where the failure occurs may be difficult if the entire document has been scrambles. FIG. 12 depicts as document 80d the document 80 in FIG. 8, after the user has:

included a fixed text (not-translated) section 80e (underscored) to the diagnostician.

selected text from the beginning of the document up to the fixed text section 80e and executed the procedure depicted in FIG. 5.

selected text from the end of the fixed text section 80e to the end of the document and executed the procedure depicted in FIG. 5, thus leaving only the fixed text section 80e unscrambled and in its original form.

The invention is not limited to end-user applications such as word-processors, spreadsheets, and databases. It can also be applied to other data processing environments such as embedded applications and configurations. For example, a data communications equipment configuration problem could be resolved by sending configuration information for analysis. FIG. 13 illustrates a menu that might be offered when the user requests to send a copy of the configuration information. Each of the choices as one goes down the list obscures the included information to a greater degree. The first step 84 is to send configuration information without changes. The second step 86 is to send the configuration information, with IDs and passwords hidden (hiding the IDs and passwords so that log-ons could not be accomplished). The third step 88 hides telephone numbers as well as IDs and passwords, so that an outsider could not access the phone numbers. Finally, at step 89, the IP addresses are hidden, along with telephone numbers, Ids and passwords.

FIG. 14 depicts selected portions of a sample dialup router configuration, showing the portions containing sensitive information. FIG. 15 illustrates how it would appear if menu choice 3 were selected, hiding account IDs, passwords, and telephone numbers, but leaving IP addressed in the clear. This information may be transmitted to an untrusted support team, over an insecure medium, or may be posted to a user group for discussion and analysis.

Of course, many modifications to the preferred embodiment are possible without departing from the spirit of the present invention. It is also possible to use to advantage some of the features of the present invention without the corresponding use of other features. For example, only a part of a document may contain sensitive information, and the present invention of securing sensitive data might be applied only to that section of the document. Additionally, in some instances the same effect could be achieved by changing only part of the document, for example, every third digit; in other instances, some of the symbols which are neither alphabetic nor numeric may be sensitive (like a "plus sign" or a "minus sign" in comparative financial tables, or the number of digits in a percentage change column might be very informative even without the actual numbers). Suitable adjustments in the systems described would be apparent to those skilled in the relevant art to accommodate such changes. It should also be noted that a document of file may contain information in a format other than text (e.g., a bit map, for example, of seismic information or photo reconnaissance information). Accordingly, the foregoing description of the preferred embodiment should be considered as merely illustrative of the principles of the present invention and not in limitation thereof, since the invention is defined solely by the claims which follow.

Having thus described the invention, what is claimed is:

1. A system for processing data for generating an output based on an input comprising:
   a module for indication that an error has occurred in the output of the processing with a first input; and
   a module coupled to the module indicating that an error has occurred for changing the first input to said data processing system to create a modified input with characteristics similar to that of the first input but with some changes from the first input so that the first data is not apparent from the modified input, said modified input causing an error similar to that which has occurred with the first input, whereby the modified input can be supplied for analysis of the error without disclosing the first input.

2. A data processing system of the type set forth in claim 1 and further including a module for identifying that an error had occurred and a module for substituting for sensitive data a functionally similar portion for at least a part of the data which includes sensitive data.

3. A data processing system of the type set forth in claim 2 and further including a module for testing the output to determine that the output from the modified input has similar characteristics to the output from the first input which includes sensitive information.

4. A data processing system of the type sent forth in claim 1 and further including a module for changing a portion of the input data to replace sensitive data from the input data without changing fundamental characteristics of the data processing system on the input.

5. A data processing system comprising:
  a microprocessor connected to at least one input device and at least one output device and;
  a program loaded into memory of the microprocessor for receiving an input file from the input device and for providing an output file as a result of the operation of the program on the input file by the microprocessor, the improvement wherein the system further includes:
    a module for indicating that an error condition occurred in the operation of the program on a first input file; and
    a module for modifying the input file to create a modified input file which is similar in function to the input file but different in appearance so that the content of the first input file cannot be discerned by examination and testing.

6. A data processing system of the type described in claim 5 and further including a module for indicating whether the error condition form the input file is present in the processing of the modified input file.

7. A data processing system of the type described in claim 6 wherein, if the module for indicating indicates that the error condition from the input file is not present in the processing of the modified input file, then a second modified input file is created using a different module and the processing of that second input file is tested to determine if the error condition from the input file is present.

8. A method of processing data and allowing error analysis without disclosing sensitive data, the steps of the method comprising:
  detecting an error condition in the processing of data from an input file; and
  modifying the input file to change at least portions of the input file in a irreversible fashion to prevent the content of the input file from being apparent on examination or analysis while allowing the use of the modified input file for replicating the error condition.

9. A method of processing data including the steps of claim 8 and further including the step of testing the processing of the modified input file to determine that the processing of the modified input file results in an error condition similar to that resulting from the processing of the input file.

10. A method of processing data including the steps of claim 8 and further including the step of forwarding the modified file to another for analysis of the error condition.

11. An article of manufacture comprising:
  a computer usable medium including a module for substituting, in response to the detection of an error in the processing of an input file by a data processing system, at least one replacement symbol in place of at least one other symbol in the input file and a module for repeating the processing of the data processing system to determine if the error occurs with the replacement symbol.

12. A system for processing data for generating an output based on an input comprising:
  a first module for responding to an indication that an error has occurred in the output of the processing with a first input;
  a second module coupled to the first module responding to the indication that an error has occurred, said second module for changing the input to the data processing system to create a second input with characteristics similar to the characteristics of the first input but with some changes so that the first input is not determinable from the second input, whereby the second input can be disclosed for analysis of the error without disclosing the first input.

13. A data processing system comprising:
  a processor connected to at least one input device and one output device;
  a first program loaded into memory associated with the processor, said program for receiving an input file from the input device and for providing an output file as a result of the program on the input file by the processor;
  a second program associated with the processor for responding to the detection of an error in the operation of the program on the original input file and for generating a modified input file, which modified input file is similar to the function of the original input file but differing from the original input file so the original input file can not be determined from the modified input file, and for using the modified input file to create a modified output file by using the first program loaded into memory associated with the processor.

* * * * *